(12) United States Patent
Chen

(10) Patent No.: US 7,261,134 B2
(45) Date of Patent: Aug. 28, 2007

(54) VEHICLE WHEEL RIM ASSEMBLY FOR MOTOR VEHICLE

(76) Inventor: Yueh Nu Chen, 5F, No. 15, Nu Chung Rd., I Lan City (TW)

( * ) Notice: Subject to any disclaimer, the term of this patent is extended or adjusted under 35 U.S.C. 154(b) by 153 days.

(21) Appl. No.: 11/095,458

(22) Filed: Apr. 1, 2005

(65) Prior Publication Data

US 2006/0219345 A1    Oct. 5, 2006

(51) Int. Cl.
  *B60C 5/00*  (2006.01)
(52) U.S. Cl. .................... 152/158; 152/381.6; 152/520
(58) Field of Classification Search ................ 152/158, 152/381.4–381.6, 399–405, 516, 520
  See application file for complete search history.

(56) References Cited

U.S. PATENT DOCUMENTS 3,587,702 A * 6/1971 Kaunitz ...................... 152/158
RE32,693 E * 6/1988 Winfield ...................... 152/158
5,194,104 A * 3/1993 Wada et al. ................. 152/152
5,988,244 A * 11/1999 Chang ......................... 152/158
2005/0217781 A1* 10/2005 Gardetto ...................... 152/520
2006/0162834 A1* 7/2006 Chen ......................... 152/381.6

* cited by examiner

*Primary Examiner*—Jason R. Bellinger
(74) *Attorney, Agent, or Firm*—Rosenberg, Klein & Lee

(57) ABSTRACT

A wheel rim assembly is disclosed to include a wheel rim body holding a tire, a plurality of smoothly arched frame bars connected to one another around the periphery of the wheel rim body by plugging a plug at one frame bar into a plughole at another frame bar and hanging a hanger at one frame bar on a locating block at another frame bar, a plurality of retaining members respectively fastened to the frame bars to enhance the connection between each two adjacent frame bars, and an annular cushion holding the frame bars and the retaining members on the inside around the wheel rim body for supporting the wheel in case the wheel is damaged accidentally.

1 Claim, 8 Drawing Sheets

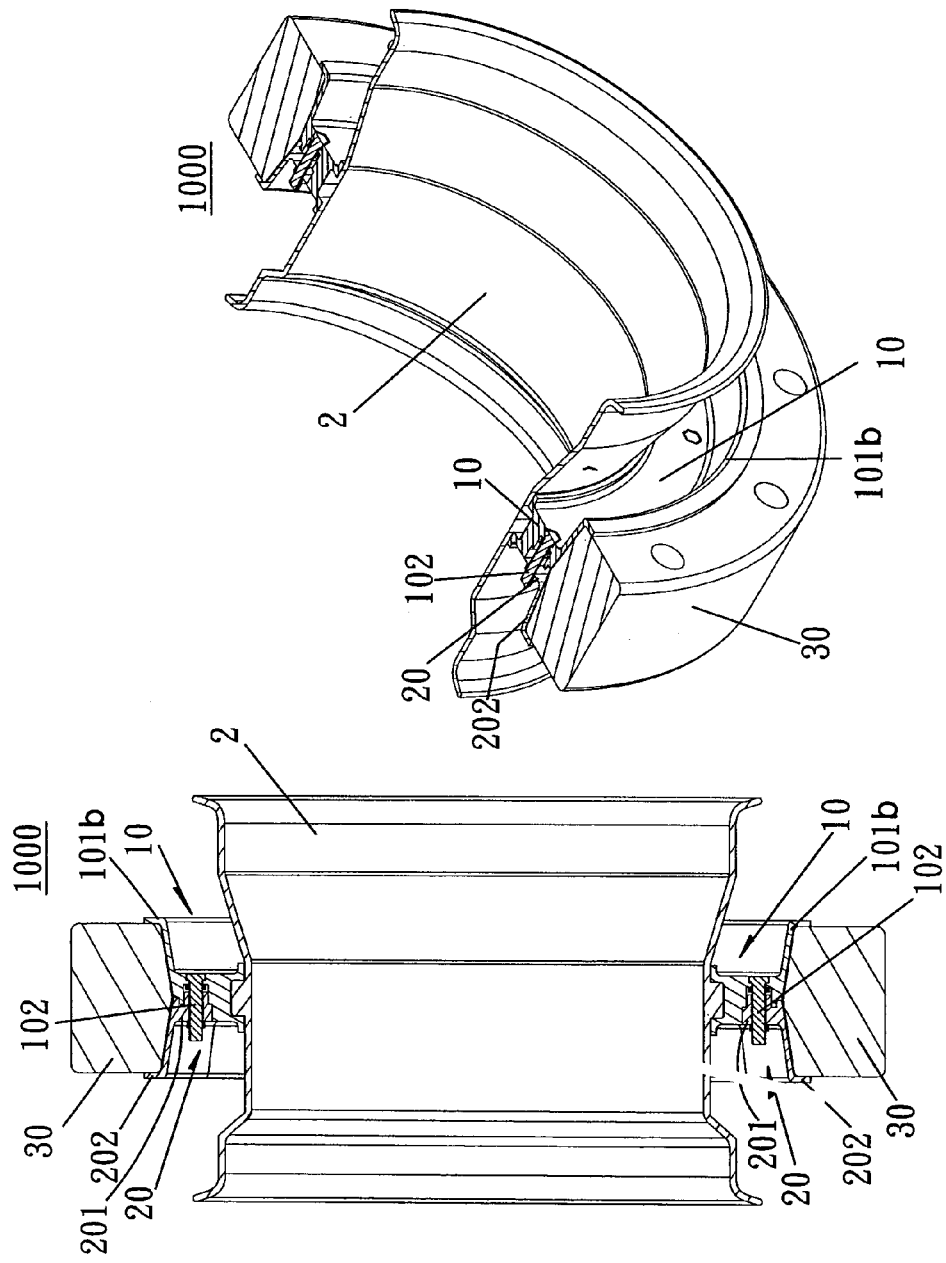

VEHICLE WHEEL RIM ASSEMBLY FOR MOTOR VEHICLE

BACKGROUND OF THE INVENTION

1. Field of the Invention

The present invention relates generally to a motor vehicle and more particularly, to a vehicle wheel rim assembly that allows the car driver to drive the car to the car shop for receiving a repair work when the tire is damaged.

2. Description of the Related Art

When the tire of a vehicle wheel is inflated, high-pressure air supports the tire in shape for running on the road. If a pointed body pierced the tire, the broken tire becomes unable to support the vehicle wheel for normal running on the road, and the damaged tire must be repaired immediately. However, it is dangerous if one of the wheels of a vehicle is damaged while driving at a high speed.

SUMMARY OF THE INVENTION

The present invention has been accomplished under the circumstances in view. It is the main object of the present invention to provide a wheel rim assembly for motor vehicle, which supports the tire in shape for enabling the car to run to a repair shop in case the tire is damaged during running. To achieve this and other objects of the present invention, the wheel rim assembly comprises a wheel rim body holding a tire, a plurality of smoothly arched frame bars connected to one another around the periphery of the wheel rim body by plugging a plug at one frame bar into a plughole at another frame bar and hanging a hanger at one frame bar on a locating block at another frame bar, a plurality of retaining members respectively fastened to the frame bars to enhance the connection between each two adjacent frame bars, and an annular cushion holding the frame bars and the retaining members on the inside around the wheel rim body for supporting the wheel in case the wheel is broken accidentally.

BRIEF DESCRIPTION OF THE DRAWINGS

FIG. 1B is a sectional plain view of the wheel rim assembly according to the present invention.

FIG. 1C is a sectional elevation of a part of the wheel rim assembly according to the present invention.

DETAILED DESCRIPTION OF THE INVENTION

Figure 1:
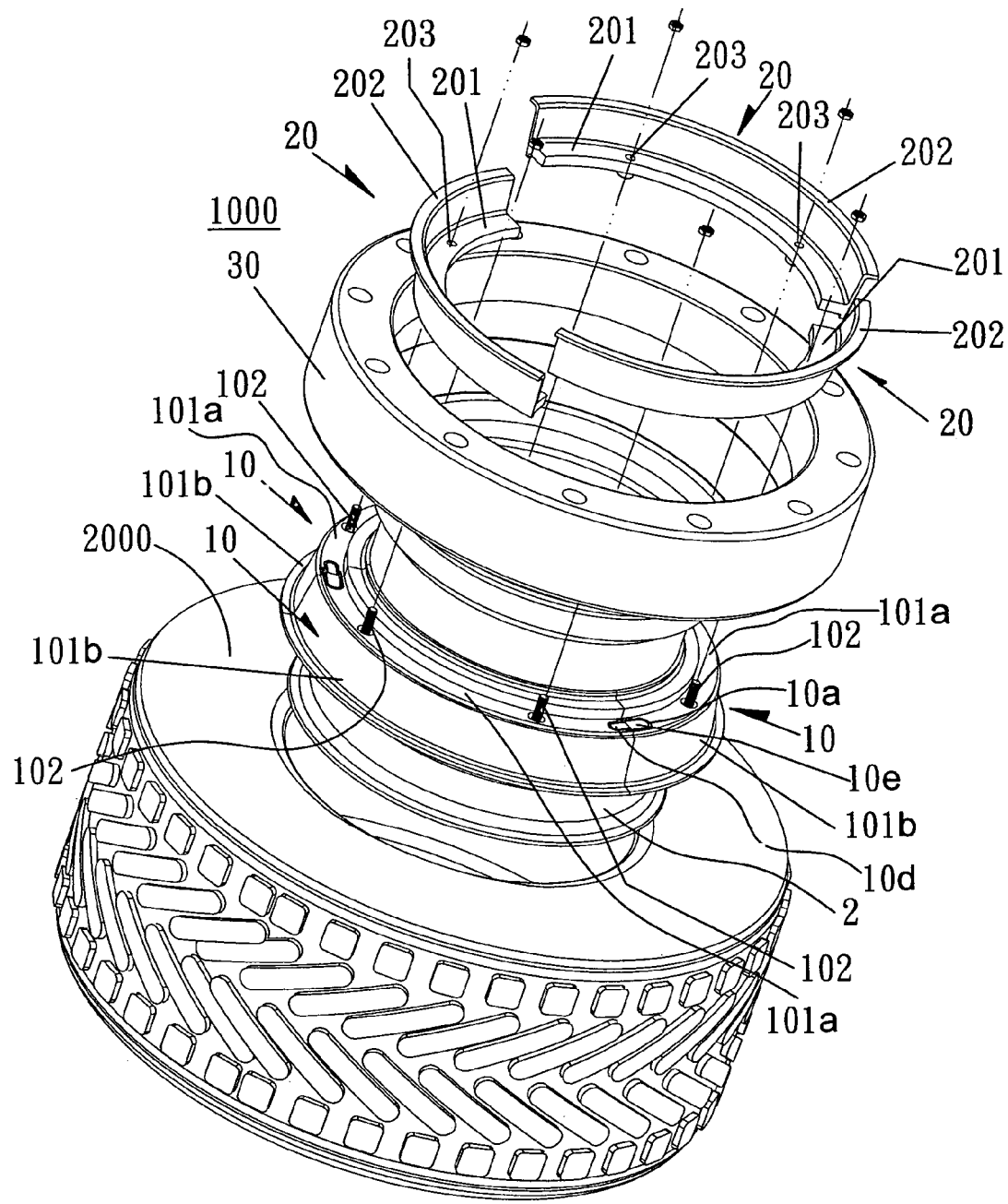
FIG. 1 is an exploded view of a wheel rim assembly according to the present invention.
Figure 1A:
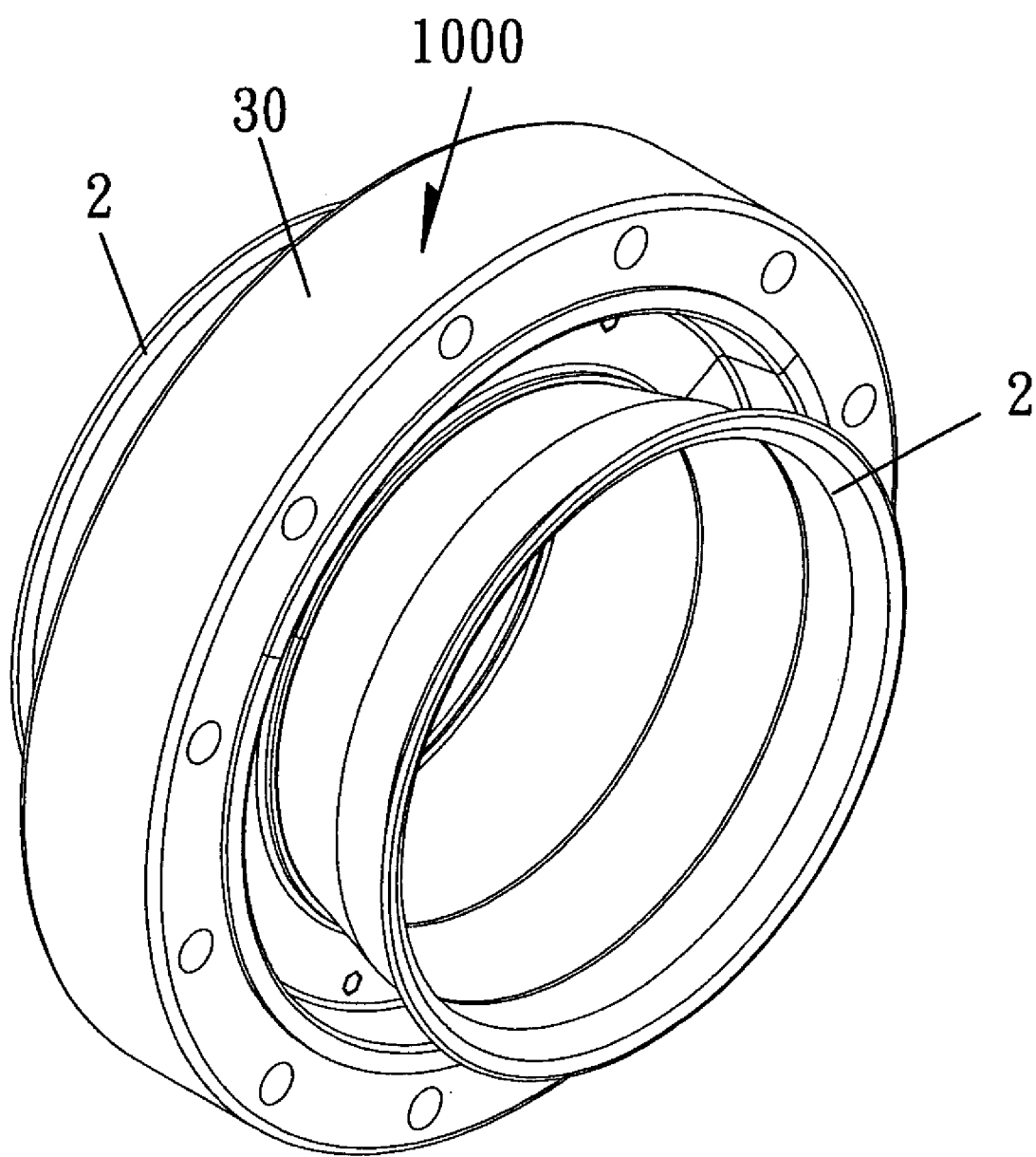
FIG. 1A is an elevational assembly view of the wheel rim assembly according to the present invention.
Figure 2:
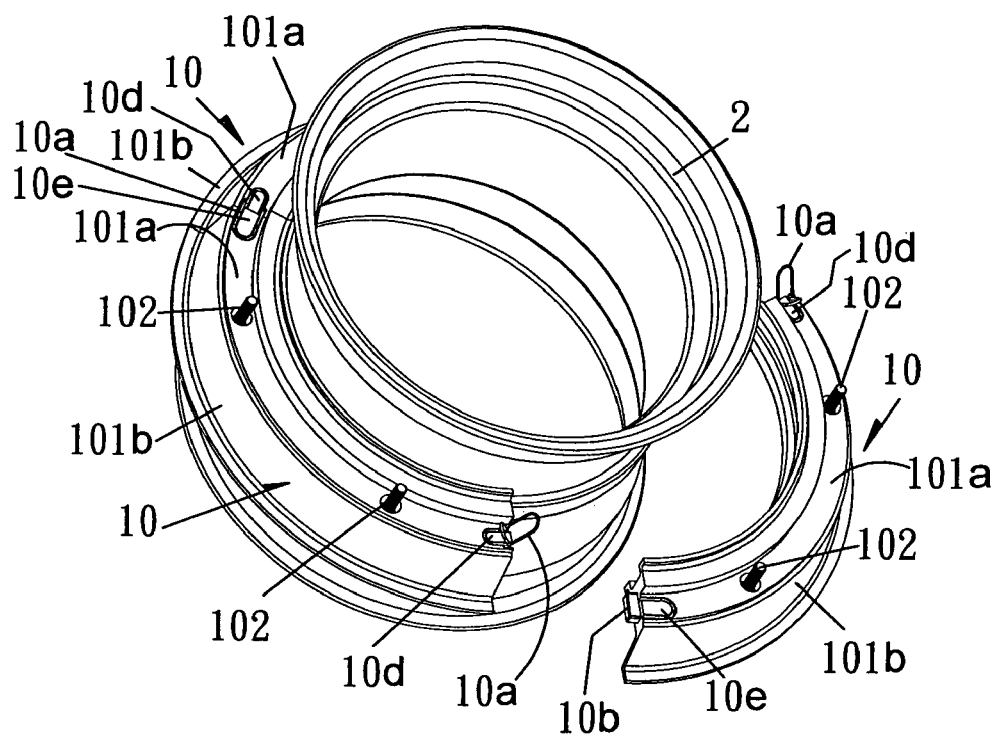
FIG. 2 is an exploded view of a part of the present invention.
Figure 3:
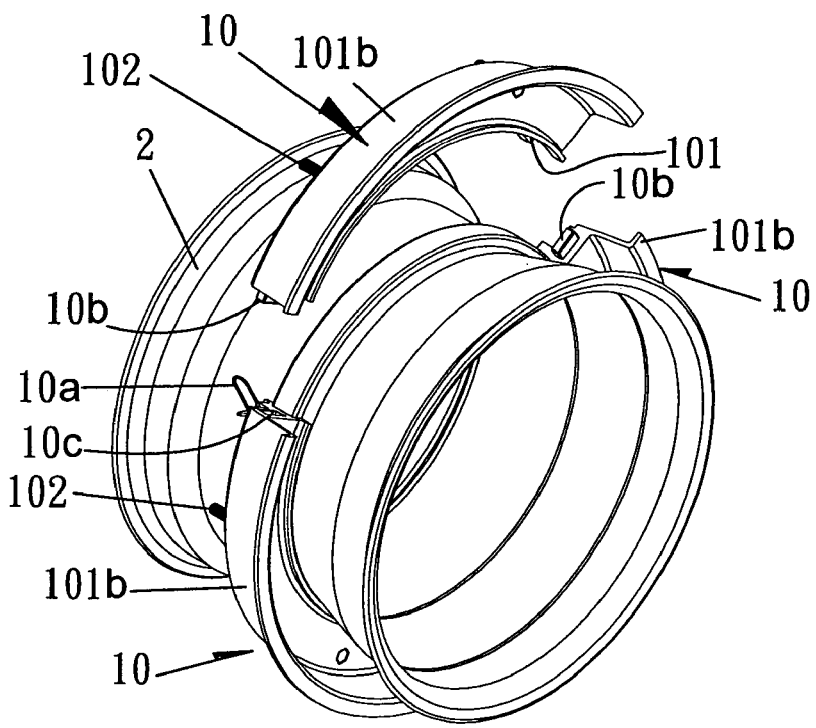
FIG. 3 corresponds to FIG. 2 when viewed from another angle.

Referring to FIGS. 1~9, a wheel rim assembly for motor vehicle in accordance with the present invention is shown comprised of a wheel rim body 2 and a supplementary tire support 1000 fastened to the wheel rim body 2 (see FIGS. 1A, 1B, and 1C).

The supplementary tire support 1000 comprises a plurality of smoothly arched frame bars 10, a plurality of smoothly arched retaining members 20, and an annular cushion 30. Each smoothly arched frame bar 10 comprises a frame base 101 covered with elastic material and fitting the periphery of the wheel rim body 2, a first mounting flange 101a extending along one side of the frame base 101, a second mounting flange 101b extending along one side of the first mounting flange 101a remote from the frame base 101, two locating blocks 10d and 10e respectively disposed near the two ends of the first mounting flange 101a, two hangers 10a respectively pivotally provided at the ends of the first mounting flange 101a, a plughole 10c formed in one end of the first mounting flange 101a, a resilient plug 10b extended from the other end of the first mounting flange 101a, and a plurality of fixed screw rods 102 spaced along the first mounting flange 101a (see FIGS. 4, 5 and 7).

Figure 6:
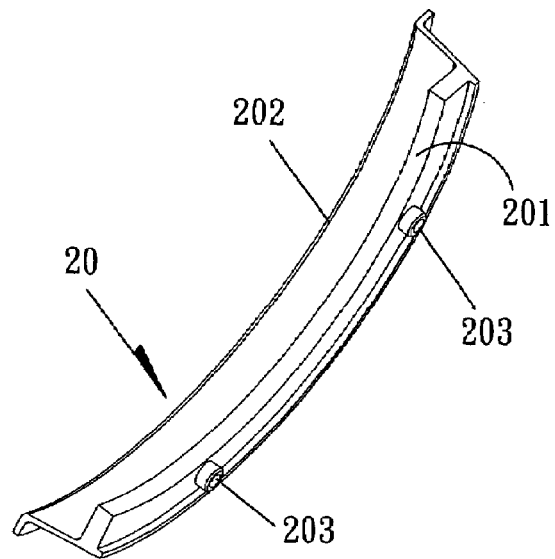
FIG. 6 is an elevational view of a retaining member for the wheel rim assembly according to the present invention.
Figure 4:
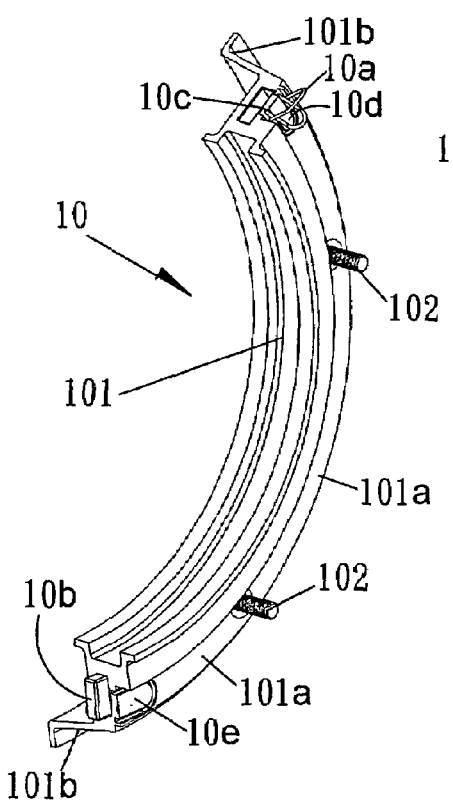
FIG. 4 is an elevational view of a smoothly arched frame bar for the wheel rim assembly according to the present invention.
Figure 5:
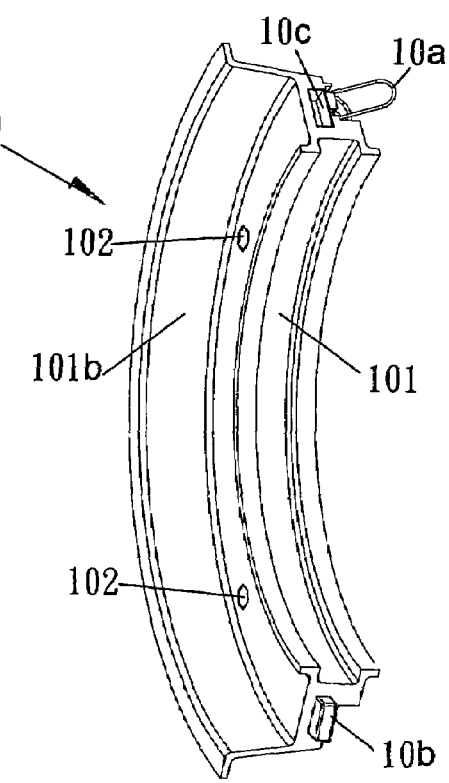
FIG. 5 corresponds to FIG. 4 when viewed from another angle.
Figure 7:
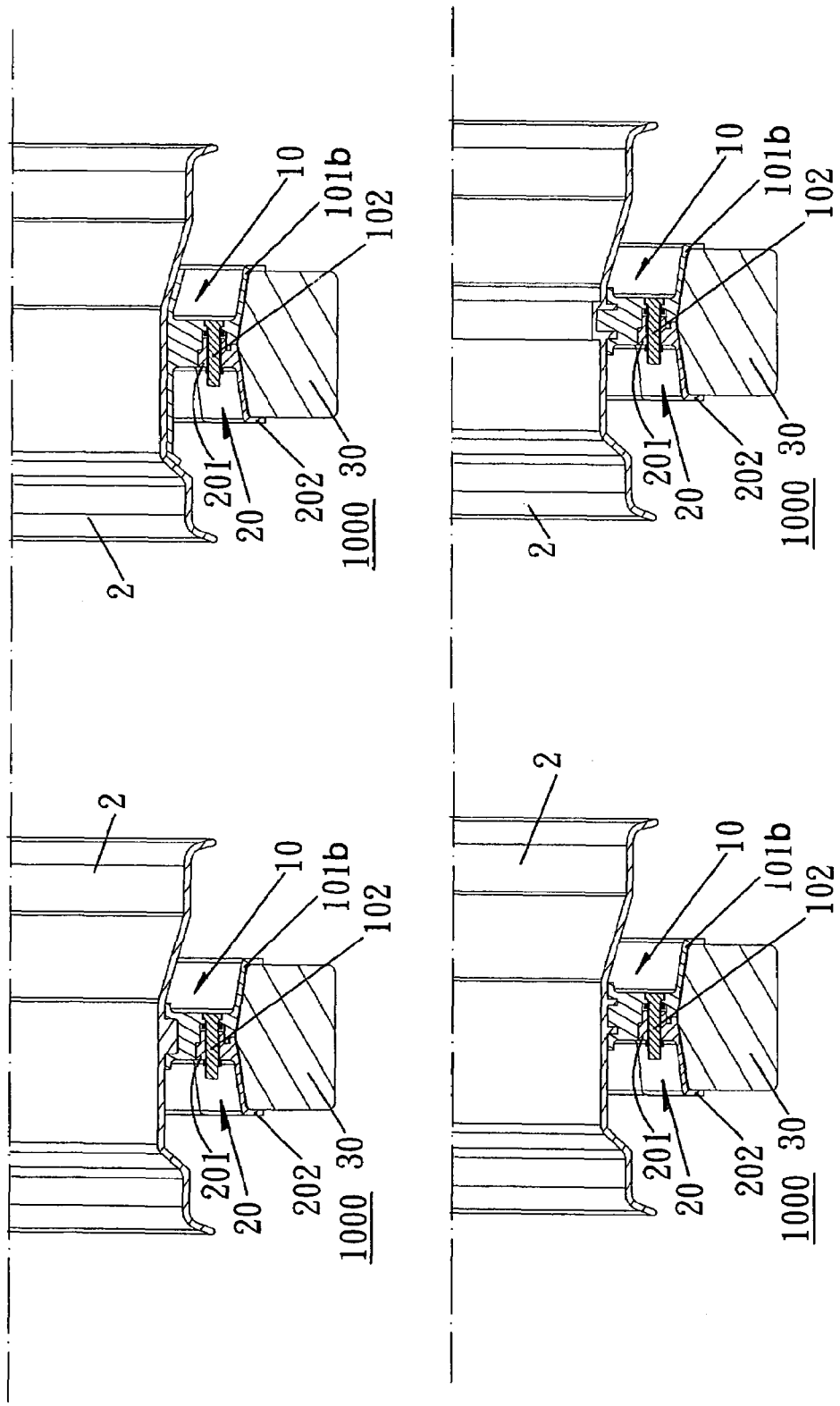
FIG. 7 shows the frame bar matched with different forms of the rim body.

Each retaining member 20 comprises a base portion 201 fitting the first mounting flange 101a of one frame bar 10, a flange 202 extending along one side of the base portion 201, and a plurality of through holes 203 formed in the base portion 21 each for receiving one screw rod 102 of one frame bar 10 (see FIG. 6).

Figure 8A:
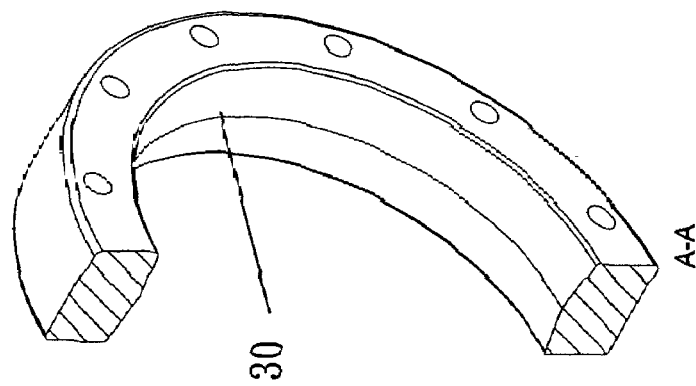
FIG. 8A is a sectional elevation taken along line A-A of FIG. 8.
Figure 8:
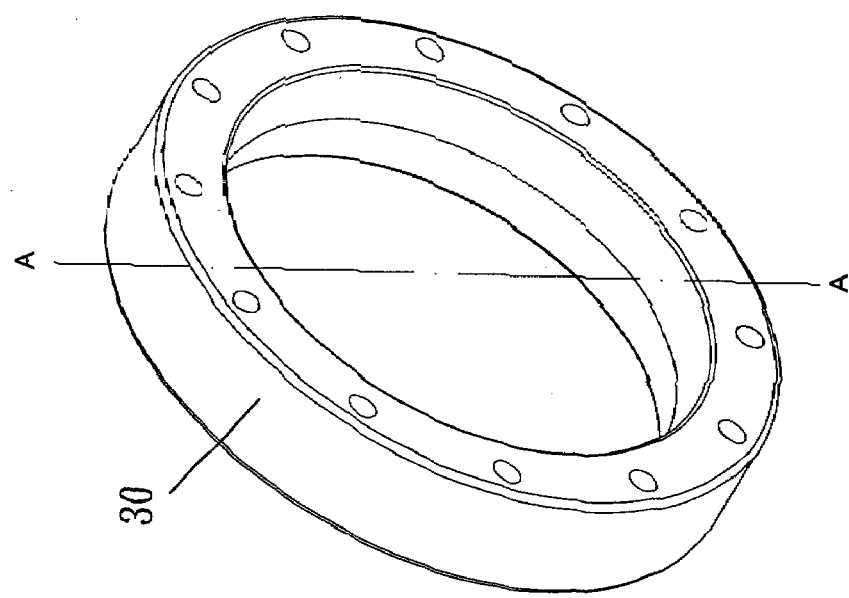
FIG. 8 is an elevational view of the annular cushion for the wheel rim assembly according to the present invention.
Figure 9:
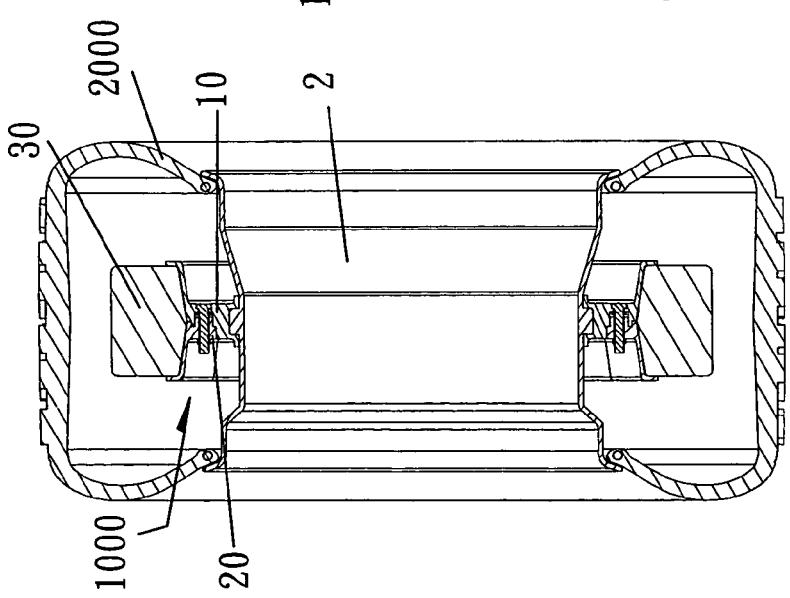
FIG. 9 is a schematic sectional view of a part of the wheel rim assembly according to the present invention.
Figure 10:
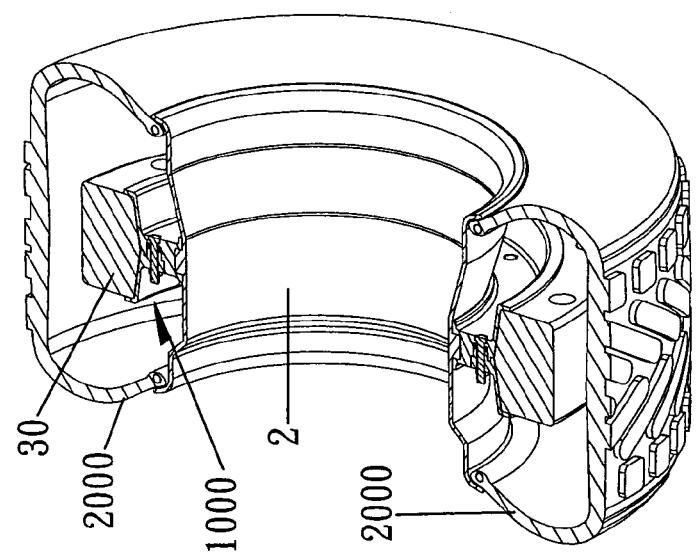
FIG. 10 is a sectional elevation of a part of the wheel rim assembly according to the present invention.

The annular cushion 30 is an internally channeled elastic member adapted to hold the frame bars 10 and the retaining members 20 on the inside around the wheel rim body 2 (see FIGS. 8 and 8a).

Referring to FIGS. 9 and 10 and FIGS. 1~3 and 6 again, the tire 2000 is fastened to one side of the wheel rim body 2 at first, and then the frame bars 10 are inserted into the inside of the tire 2000 and joined together around the wheel rim body 2 by inserting the plug 10b of one frame bar 10 into the plughole 10c of another and fastening the respective hangers 10a of one frame bar 10 to the respective locating blocks 10d and 10e of the adjacent frame bars 10, and then the annular cushion 30 is mounted in the tire 2000 around the joined frame bars 10, and then the retaining members 20 are set in the annular cushion 30 to force the through holes 203 of the retaining members 20 into engagement with the screw rods 102 of the frame bars 10 respectively, keeping each retaining member 20 connected between two frame bars 10.

Figure 11:
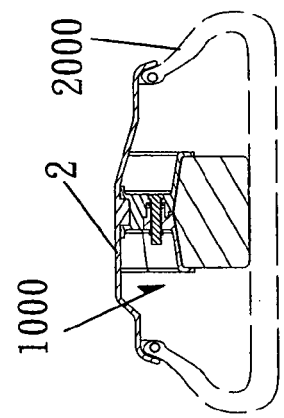
FIG. 11 is a schematic drawing showing the tire damaged broken and supported on the supplementary tire support according to the present invention.

Referring to FIG. 11, when the tire 2000 is damaged, the supplementary tire support 1000 support the damaged tire 2000, enabling the driver to drive the car to a vehicle repair shop for repair.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wheel rim assembly including a wheel rim body supporting a tire and a supplementary tire support mounted in said tire around said wheel rim body, wherein said supplementary tire support comprises:

a plurality of smoothly arched frame bars, said smoothly arched frame bars each comprising a frame base, a first mounting flange extending along one side of said frame base, said first mounting flange having two ends, a second mounting flange extending along one side of said first mounting flange remote from said frame base, two locating blocks respectively disposed near the two ends of said first mounting flange, two hangers respectively pivotally provided at the two ends of said first mounting flange, a plughole formed in one end of said first mounting flange, a resilient plug extending from the other end of said first mounting flange, and a plurality of fixed screw rods spaced along said first mounting flange, said smoothly arched frame bars being connected in series around said wheel rim body with the resilient plug of one of said smoothly arched frame bars engaged into the plughole of another one of said smoothly arched frame bars and with the respective hangers of said smoothly arched frame bars fastened to the respective locating blocks of the adjacent frame bars;

a plurality of retaining members respectively fastened to said smoothly arched frame bars, said retaining members each comprising a base portion fitting the first mounting flange of each two adjacent ones of said smoothly arched frame bars, said retaining members having a flange extending along one side of said base portion thereof, and a plurality of through holes formed in said base portion each for receiving one screw rod of one of said smoothly arched frame bar; and an annular cushion adapted to hold said smoothly arched frame bars and said retaining members on an inside of the tire around said wheel rim body.

* * * * *